United States Patent
Suppa et al.

(10) Patent No.: US 7,424,964 B2
(45) Date of Patent: Sep. 16, 2008

(54) EXTRACTOR FOR TOWED LINEAR ANTENNA OR THE LIKE

(75) Inventors: Vito Suppa, Roquefort les Pins (FR); Christophe Borel, Brest (FR)

(73) Assignee: Thales (FR)

( * ) Notice: Subject to any disclaimer, the term of this patent is extended or adjusted under 35 U.S.C. 154(b) by 172 days.

(21) Appl. No.: 10/566,096

(22) PCT Filed: Jul. 15, 2004

(86) PCT No.: PCT/EP2004/051500

§ 371 (c)(1),
(2), (4) Date: Jan. 27, 2006

(87) PCT Pub. No.: WO2005/014453

PCT Pub. Date: Feb. 17, 2005

(65) Prior Publication Data

US 2006/0180626 A1 Aug. 17, 2006

(30) Foreign Application Priority Data

Jul. 29, 2003 (FR) .................................. 03 09333

(51) Int. Cl.
*B65H 20/36* (2006.01)
(52) U.S. Cl. ....................... 226/170; 226/172
(58) Field of Classification Search ......... 226/170–173, 226/182
See application file for complete search history.

(56) References Cited

U.S. PATENT DOCUMENTS

| | | | | |
|---|---|---|---|---|
| 1,941,993 A | * | 1/1934 | Minton | 226/170 |
| 2,198,178 A | * | 4/1940 | Postlewaite | 414/431 |
| 2,679,924 A | * | 6/1954 | Powell | 226/172 |
| 2,789,687 A | * | 4/1957 | Cuccio | 405/199 |
| 3,146,476 A | * | 9/1964 | Caperton | 15/104.33 |
| 3,586,227 A | * | 6/1971 | Krogsrud | 226/170 |
| 4,274,574 A | * | 6/1981 | Bishop | 226/170 |
| 4,699,305 A | * | 10/1987 | Diener et al. | 226/170 |
| 4,869,412 A | | 9/1989 | Bishop | |
| 5,533,658 A | * | 7/1996 | Benedict et al. | 226/172 |
| 5,775,417 A | * | 7/1998 | Council | 166/77.3 |
| 5,839,636 A | | 11/1998 | Fleischmann | |

FOREIGN PATENT DOCUMENTS

| | | |
|---|---|---|
| FR | 1 119 158 | 6/1956 |
| FR | 2 567 864 | 1/1986 |

* cited by examiner

*Primary Examiner*—Evan H Langdon
(74) *Attorney, Agent, or Firm*—Lowe Hauptman Ham & Berner, LLP

(57) ABSTRACT

The present invention relates to a device for the automatic hauling of very long elongate objects. This device in particular allows very long tubular objects of relatively flexible and delicate structure such as, in particular, underwater cables, pipes or alternatively linear sonar antennas of the "streamer" type to be handled.

Figure 1:
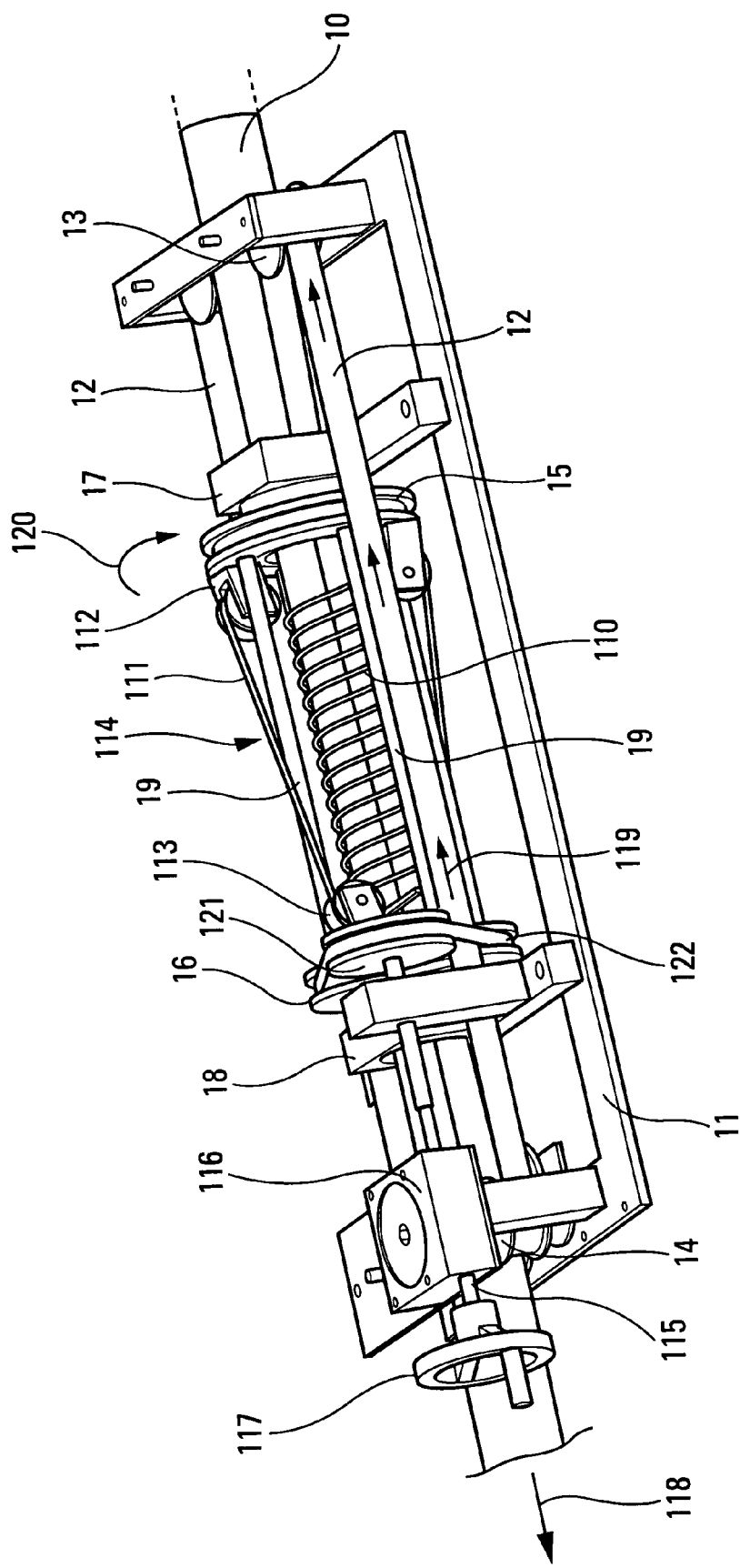

The device chiefly comprises traction means consisting of at least two running strips with rough surfaces which are pressed on each side of the object and drag it along in a traction movement and gripping means which constantly keep the running strips pressed against the object in order to ensure good adhesion. Another subject of the invention is means for actuating the traction means and the gripping means in a coordinated manner so that the object that is to be hauled experiences continuous traction throughout the hauling operation.

The device according to the invention has the advantage of being mounted on a stationary chassis and therefore of not requiring an operating area. It is thus particularly intended for vessels where the available space is restricted, such as submarines.

11 Claims, 3 Drawing Sheets

EXTRACTOR FOR TOWED LINEAR ANTENNA OR THE LIKE

The present invention relates to a device for the automatic hauling of very long elongate objects. This device in particular allows a very long tubular object of relatively flexible and delicate structure to be put to sea or alternatively brought back on board and stored in a hold. Included amongst these objects, mention may in particular be made of underwater cables, pipes or alternatively, linear sonar antennas of the "streamer" type.

The handling of substantially tubular and very long objects is a tricky operation generally performed or at least controlled by human operators. The operation is also made all the more delicate if the object handled has a flexible and delicate structure comprising, for example, a succession of relatively delicate objects placed in a more flexible tubular sheath. Likewise, the handling of an object of tubular overall shape that exhibits unevenness in its diameter over its length is an operation that is awkward.

In the case of surface vessels or underwater vessels deploying sonars equipped with tubular antennas of the "streamer" type, for example, putting the antennas to sea is generally done by hand by several operators. The antenna, stored on a winch, is hauled by the operators who leave the free end dangling in the water. Hauling is continued until the submerged length is sufficient and deployment continues of its own accord by a dragging effect, under the action of the weight of the antenna combined with the speed of the ship. Apart from being awkward, this operation may prove dangerous if not impossible to achieve. This is particularly the case when the sea state makes standing upright on the area of the deck of the ship from which this operation is performed difficult.

Such implementation difficulties are also encountered when a cable-laying ship puts a telephone or electric cable, for example, to sea.

There are of course various devices in existence for facilitating the putting-to-sea of elongate or tubular objects of large dimensions. Mention may be made of fixed or releasable floating anchors which drag along with them the object to which they are moored at one end. Mention may also be made of handling devices such as, for example, press rollers, conveyor belts, round turns over drive pulleys, etc. All these devices exhibit significant disadvantages of a mechanical nature. These disadvantages result in particular in excessive pressure or tensile stresses exerted on the object being handled. Stresses which are too high or badly distributed may damage this object.

Such devices are also ill-suited to the handling of objects the diameter of which is not constant or objects that exhibit rigid portions. The same goes for objects that have a sheath the surface finish or hardness of which impedes the operation of the device used.

These implementation disadvantages make the various existing devices difficult to automate, it being necessary if not essential for an operator to be present.

In order to palliate the disadvantages, the invention proposes an automatic handling device allowing objects of substantially tubular shape and great length to be handled. To this end, its subject is an automatic device for handling elongate objects comprising in particular traction means consisting of at least two running strips with rough surfaces which are pressed on each side of the object and drag it along in a traction movement and gripping means which constantly keep the running strips pressed against the object in order to ensure good adhesion. Another subject of the invention is means for actuating the traction means and the gripping means in a coordinated manner so that the object that is to be hauled experiences continuous traction throughout the hauling operation.

The device according to the invention has the advantage of being mounted on a stationary chassis and therefore of not requiring an operating area. It is thus particularly intended for vessels where the available space is restricted, such as submarines.

It also has the advantage of performing a continuous hauling action which makes less demands on the strength of the object in tension. In addition, it can advantageously be adapted to suit objects the cross section of which is not constant.

Figure 2:
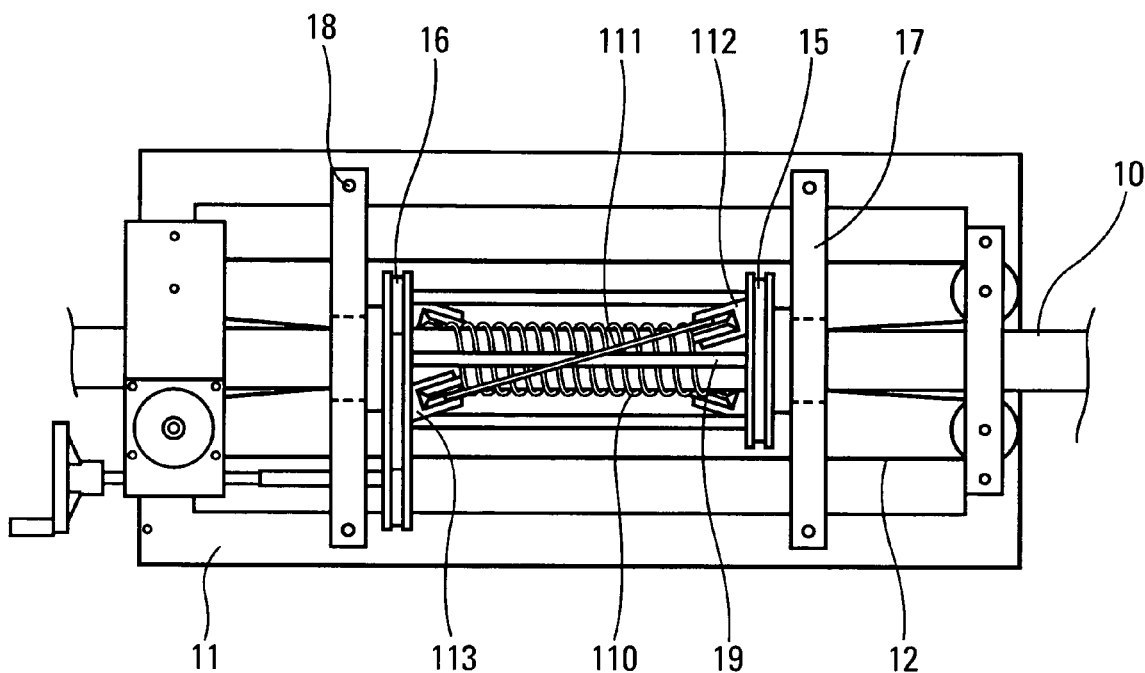
Figure 3:
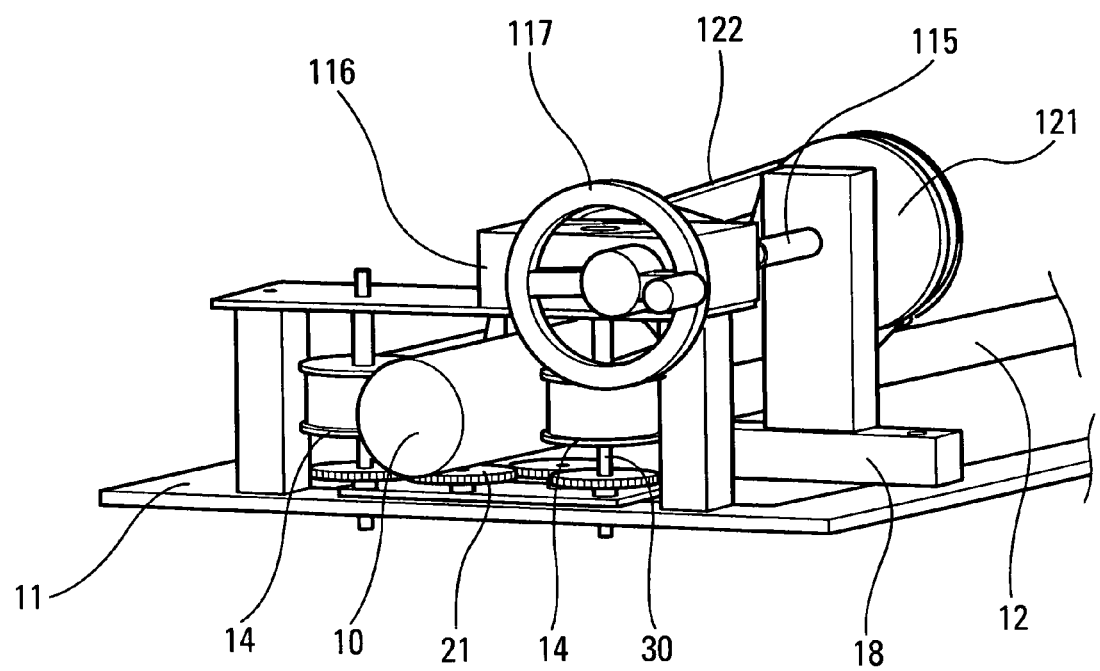

Other features and advantages will become apparent in the course of the description which follows, which description will be given with reference to the attached figures which depict:

FIG. 1, an overall view of the device according to the invention;

FIG. 2, a view of the device from above,

FIG. 3, a front perspective partial view of the device.

FIG. 1 shows an overall view of one possible embodiment of the device according to the invention. The device depicted comprises a main chassis 11 which supports two mechanisms forming the traction means for pulling the object 10 that is to be hauled, and the gripping means.

The traction means consist mainly of a set of two flat belts 12 forming running strips positioned one on each side of and along the object 10. Each strip 12 is wound around two pulleys 13 and 14 fixed to uprights situated at each of the ends of the main chassis. The surfaces of these running strips which come into contact with the surface of the object 10 are preferably rough in order to afford better adhesion for traction. The running strip will therefore preferably be made of a material with a high coefficient of friction.

The gripping means consist of two disk-shaped plates 15 and 16 connected to one another by uprights 19. These plates are mounted such that they are rotationally mobile about the longitudinal axis of the device on holding pieces 17 and 18 via bearings, for example. The assembly forms a chassis 114 able to move rotationally. The plate 15 is in the form of a simple disk, while the plate 16 which drives the rotation of the chassis 114 has the form of a pulley and has a groove. The central parts of the plates 15 and 16 of the folding pieces 17 and 18 are perforated, so that the object 10 that is to be hauled can pass through them.

The gripping means ensure contact between the running strips 12 and the object 10 to be hauled, by means of belts 110, helically wound around the object that is to be hauled and around the portions of the running strips that are in contact with the object. Winding is tight enough to keep the object and the running strips in contact with one another. The ends of each of the belts are connected together to form a straight strand 111 which passes through the grooves of the opposite pulleys 112 and 113. These pulleys, the particular function of which is to tension the belts, are fixed to each of the plates 15 and 16 respectively, as shown by FIG. 2.

To enhance the tightening action and to center the object that is to be hauled, the gripping means may comprise several belts, preferably elastic belts of circular cross section. FIGS. 1 and 2 show a nonlimiting example of a device comprising gripping means consisting of three belts just two of which are visible. These belts are wound in spirals in the manner of a three-start helix.

As stated hereinabove, the assembly consisting of the plates 15 and 16 and of the uprights 19 forms a chassis 114 able to rotate about the longitudinal axis of the device. Depending on the direction in which it rotates, the chassis allows the belt to be wound onto the object 10 via one of its ends and at the same time unwound via the other end.

In order to haul the object 10, the device according to the invention also comprises means for moving the traction and gripping means. In the exemplary embodiment illustrated in FIGS. 1 and 2, these means comprise a main shaft 115 and a reduction gear system 116 to which secondary shafts are coupled for rotating the pulleys 14 which drive the running strips 12 and the pulley 16 which drives the rotation of the chassis 114. In the exemplary embodiment, the pulley 16 is coupled via a belt 122 to another pulley 121 secured to the shaft 115. The depiction of FIG. 3 offers a more detailed view of the layout of the various elements that the movement-instigating means comprise. In the example illustrated in FIGS. 1, 2 and 3, the pulleys that drive the running strips 12 are set in rotation by a single secondary shaft 30 and a set of gears 31.

The movement of the running strips 12 and of the chassis 114 are synchronized in such a way as to ensure that the object 10 is hauled correctly. The main shaft is, for example driven by an electric or hydraulic motor or more simply by means of a cranking handle as depicted in FIGS. 1 and 2.

The device according to the invention therefore comprises two separate means for performing the functions of traction and of gripping. The traction means are given a translational movement along the axis of travel of the object, while the gripping means are given a rotational movement about the same axis. The separation of the means has the advantage of decoupling the forces exerted on the object 10. This decoupling allows effective traction to be exerted without the need to exert an excessively high, if not to say damaging, pressure on the object that is to be hauled. The object hauling movement is thus afforded by the collaboration of the two means. The way in which the device of the invention works may be described as follows.

In order to move the object 10 in the direction featured by the arrow 118, the shaft 115 is actuated in such a way that the rotating of the pulleys 14 causes the running strips 12 to move in the direction featured by the arrows 119. The movement of the running strips leads to an identical movement of the object 10.

At the same time, the rotating of the shaft 115 causes the chassis 114 to rotate in the direction featured by the arrow 120. This rotation causes the belts 110 to be wound at the plate 15 end and at the same time unwound at the pulley 16 end. This twofold action has the effect of causing a relative displacement of the gripping means along the object 10 in the opposite direction to the actual direction of travel of the object 10 and of the running strips 12. Thus, the object 10 is able to progress linearly while at the same time being kept closely in contact with the running strips.

The displacement of the object is analogous to the linear and continuous displacement of the mobile jaw of a vise along the lead screw which allows for clamping when the vise is tightened or slackened off.

Conversely, since the way in which the device works is symmetric by construction, displacement of the object 10 in the opposite direction may be afforded by turning the shaft 115 in the opposite direction.

For it to be actually possible to achieve the hauling action it is necessary for the rotational movement of the chassis to lead to a relative displacement the magnitude of which is roughly equal to the displacement imparted to the object via the rotation of the running strips 12. The two movements have to be coordinated in the way shown in FIG. 1 by mechanical means such as, for example, a reduction device mounted on the shaft 115. However, any regulating means that allows the two movements to be made to coincide may just as well be used.

The gripping means comprise one or several belts 110, wrapped around the running strips and around the object that is to be hauled, the purpose of these being to, by pressing, ensure close contact between the object and the running strips. To do that, the belts used are preferably belts made of elastic fibers. Such belts have the advantage of compensating for any small lack in coordination that there could be between the movements. In addition, their elasticity allows them to grip objects the cross section of which is not constant over their entire length.

The movement-instigating means described in the foregoing are presented by way of nonlimiting example. It is of course possible to imagine other means, allowing the traction and gripping means to be set in motion and coordinating them correctly.

The device according to the invention as described in the foregoing text has the considerable advantage of constituting a stationary and therefore small-bulk hauling device. In particular, using it does not require the provision of an area to move around in as was required, for example, by a traction hauling device involving a traction carriage moving back and forth.

As has already been stated, the device also has the advantage of exerting a continuous hauling movement which in particular prevents the hauled object from experiencing jerkiness that could damage it. The movement is also reversible and can be used for putting the object 10 to sea.

The device according to the invention may also advantageously be adapted to suit the hauling of objects of non-constant cross section or alternatively of objects consisting of rigid portions and of portions that are more flexible.

It may also operate automatically and thus have the advantage of restricting the need to resort to human intervention under conditions which are sometimes rather perilous.

The invention claimed is:

1. A device for the hauling a long elongate object, comprising:

traction means for undergoing translational movement and for contacting and frictionally driving an elongate object to be hauled, gripping means configured for automatically keeping the traction means and the elongate object continuously in contact with one another over at least a section of the elongate object, the gripping means being further configured to automatically adapt to variations in diameter of the elongate object during operation of the traction means and to be relatively movable with respect to the elongate object, in a direction opposite to the direction of hauling; and movement instigating means for coordinatingly actuating the traction means and the gripping means;

wherein the traction means, gripping means and the movement instigating means perform separate functions that cooperate in order to ensure continuous traction on the elongate object that is to be hauled, without applying damaging pressure to the elongate object.

2. The device as claimed in claim 1, wherein said traction means comprise two running strips made of a material with a high coefficient of friction, the running strips being wound around two pulleys, the running strips and the pulleys being configured that each strip contacts by a part of its surface with the elongate object that is to be hauled.

3. The device as claimed in claim 2, wherein said gripping means comprise a chassis being rolatably positioned about an axis of traction of the elongate object, the chassis comprising at least one belt helically wound around the elongate object that is to be hauled and around the portions of the running strips that are in contact with; the ends of the belt being connected to form a straight strand which passes through the grooves of two opposite pulleys.

4. The device as claimed in claim 3, wherein the chassis is driven to rotate around the elongate object to be hauled and to cause the belt to wind around the elongate object that is to be hauled and around the running strips via one of its ends, and to unwind simultaneously from the other end; the rotation of the belt causing the gripping means to undergo relative translation movement with respect to the hauled elongate object.

5. The device as claimed in claim 4, wherein said belt is made up of elastic fibers.

6. The device as claimed in claim 1, wherein said means for actuating the traction means and the gripping means are driven by a hydraulic motor.

7. The device as claimed in claim 1, wherein said means for actuating the traction means and the gripping means are driven by an electric motor.

8. The device as claimed in claim 1, wherein said means for actuating the traction means and the gripping means are driven by means of a cranking handle.

9. The device as claimed in claim 5, wherein said means for actuating the traction means and the gripping means are driven by a hydraulic motor.

10. The device as claimed in claim 5, wherein said means for actuating the traction means and the gripping means are driven by an electric motor.

11. The device as claimed in claim 5, wherein said means for actuating the traction means and the gripping means are driven by means of a cranking handle.

\* \* \* \* \*